(12) United States Patent
Lübcke

(10) Patent No.: US 6,339,991 B1
(45) Date of Patent: Jan. 22, 2002

(54) METHOD FOR DETERMINING THE POSITION OF AN ENGRAVING ELEMENT

(75) Inventor: Bernd Lübcke, Molfsee (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/646,247

(22) PCT Filed: Mar. 2, 1999

(86) PCT No.: PCT/DE99/00539

§ 371 Date: Oct. 30, 2000

§ 102(e) Date: Oct. 30, 2000

(87) PCT Pub. No.: WO99/47353

PCT Pub. Date: Sep. 23, 1999

(30) Foreign Application Priority Data

Mar. 18, 1998 (DE) .......................................... 198 11 637

(51) Int. Cl.[7] .................................................. B41L 3/02
(52) U.S. Cl. ........................... 101/486; 101/32; 101/3.1
(58) Field of Search .......................... 101/32, 485, 486, 101/128.4, 465, 466, 467; 400/279, 320, 322, 323, 705, 705.1, 903; 358/297, 299, 477, 478; 409/109

(56) References Cited

U.S. PATENT DOCUMENTS

| | | | |
|---|---|---|---|
| 4,044,881 A | 8/1977 | Chai et al. | |
| 4,937,593 A | 6/1990 | Prats | |
| 4,947,166 A | 8/1990 | Wingate et al. | |
| 5,074,690 A | 12/1991 | Del Signore, II et al. | |
| 5,075,609 A | * 12/1991 | Ito et al. ...................... | 400/903 |
| 5,411,340 A | * 5/1995 | Elgee ......................... | 400/279 |
| 5,492,057 A | 2/1996 | Bornhors, Jr. et al. | |
| 5,947,020 A | * 9/1999 | Bornhorst, Jr. et al. ....... | 101/32 |
| 6,133,706 A | * 10/2000 | Quintana .................... | 400/705 |

FOREIGN PATENT DOCUMENTS

JP 241103 * 9/2000

* cited by examiner

Primary Examiner—Ren Yan
(74) Attorney, Agent, or Firm—Schiff Hardin & Waite

(57) ABSTRACT

In a method for determining the axial position of an engraving element in an engraving machine used for engraving impression cylinders, the engraving machine has a fixed toothed comb in which a significant tooth flank of each tooth presents an axial distance which is a multiple of the tooth spacing of the toothed comb to a reference point. A photo-electric barrier which serves as axial reference mark is positioned on the engraving element and the toothed comb serves as black-out element for said photo-electric barrier. The engraving element is displaced by means of the photo-electric barrier from a momentary position to the nearest relevant tooth flank of the toothed comb. The approximate distance between the reference mark and the reference point is measured by means of a distance meter. Next, the approximate distance is compared with the multiple of the tooth spacing of the toothed comb and the exact distance between the reference mark of the engraving element and the reference point is determined from this comparison.

14 Claims, 3 Drawing Sheets

METHOD FOR DETERMINING THE POSITION OF AN ENGRAVING ELEMENT

BACKGROUND OF THE INVENTION

The invention is in the field of electronic reproduction technology and is directed to a method and to an apparatus for the determination of the axial position of an engraving element in an electronic engraving machine for engraving print cylinders for rotogravure, and is also directed to an engraving machine with such an apparatus.

When engraving print cylinders in an electronic engraving machine, an engraving element, which comprises, for example, an electromechanical engraving element with an engraving stylus as cutting tool, moves in the axial direction along a rotating print cylinder. The engraving stylus controlled by an engraving control signal cuts a sequence of cups of different depth arranged in an engraving raster into the generated surface of the print cylinder. The engraving control signal is formed by superimposition of an image signal, which represents the gradations to be engraved between "light" (white) and "dark" (black), with a periodic raster signal. Whereas the periodic raster signal effects a vibrating lifting motion of the engraving stylus for producing the engraving raster, the image signal values determined the depths of the cups engraved into the generated surface of the print cylinder and, thus, the engraved gradations.

In order to axially position the engraving element before the engraving and move it along the print cylinder in the axial direction during the engraving, the engraving element is driven by a spindle drive that is often designed as a stepping motor drive. The stepping motor is driven by a motor clock sequence, each clock thereof corresponding to a traversed, axial path increment of the engraving element. By counting the clocks of the motor clock sequence with a position counter, thus, the respective axial position of the engraving element can be identified, the engraving element can be displaced onto a defined axial position by counting a predetermined number of clocks.

Before the start of engraving, the position counter of the stepping motor drive must be reset and the respective, axial actual position of the engraving element upon reset—called the zero position—must be identified, so that the engraving element, proceeding from the identified zero position, can be subsequently shifted to a desired, axial rated position.

U.S. Pat. No. 5,492,057 already discloses a method for determining the axial position of engraving elements in an electronic engraving machine with the assistance of sensors.

U.S. Pat. No. 5,074,690 likewise already discloses that a toothed comb be employed as an absolute value sensor for determining the zero position in a matrix printer.

The traditional method for determining the zero position of an engraving element occurs either with a first light barrier that recognizes a shadowing element called zero flag that is attached to the engraving element or with an absolute value sensor. Particularly given simultaneous engraving with a plurality of engraving elements, the traditional method has the disadvantage that a plurality of zero flags corresponding in number to the plurality of engraving elements must first be optimally precisely adjusted in order to achieve an adequate precision in the determination of the zero position. Over and above this, the employment of a plurality of absolute value sensors is expensive.

SUMMARY OF THE INVENTION

It is therefore an object of the present invention to improve a method and an apparatus for determining the axial position of at least one engraving element in an electronic engraving machine for engraving print cylinders for rotogravure as well as an electronic engraving machine having such an apparatus such that a high precision in the position detection is achieved with relatively little expanse and an automatic implementation becomes possible.

According to the present method and apparatus of the present invention for determining an axial position of at least one engraving element in an electronic engraving machine for engraving a print cylinder, an engraving element engraves a series of cups arranged in an engraving raster into a print cylinder, engraved depths of the cups determining gradations to be engraved between light and dark. For planar engraving of the cups, with the engraving element executing a feed motion along the print cylinder that is directed in an axial direction of the print cylinder. A momentary axial position of the engraving element relative to the print cylinder is determined before the engraving. A stationary toothed comb is provided directed in an axial direction of the print cylinder whereby one of tooth faces of each and every tooth represents an axial distance from an axial reference point as a multiple of a toothed division of the toothed comb. The engraving element has an axial reference mark. The engraving element together with its reference mark is displaced from its momentary position onto a closest, relevant toothed face of the toothed comb into the axial position of the engraving element to be determined. An approximate distance of the reference mark from the reference point is measured. The measured approximate distance is compared to the multiple of the toothed division of the toothed comb. An exact distance of the position of the engraving element from the reference point is determined from the comparison.

The invention is explained in greater detail below on the basis of FIGS. 1 through 4.

DESCRIPTION OF THE PREFERRED EMBODIMENTS

Figure 1:
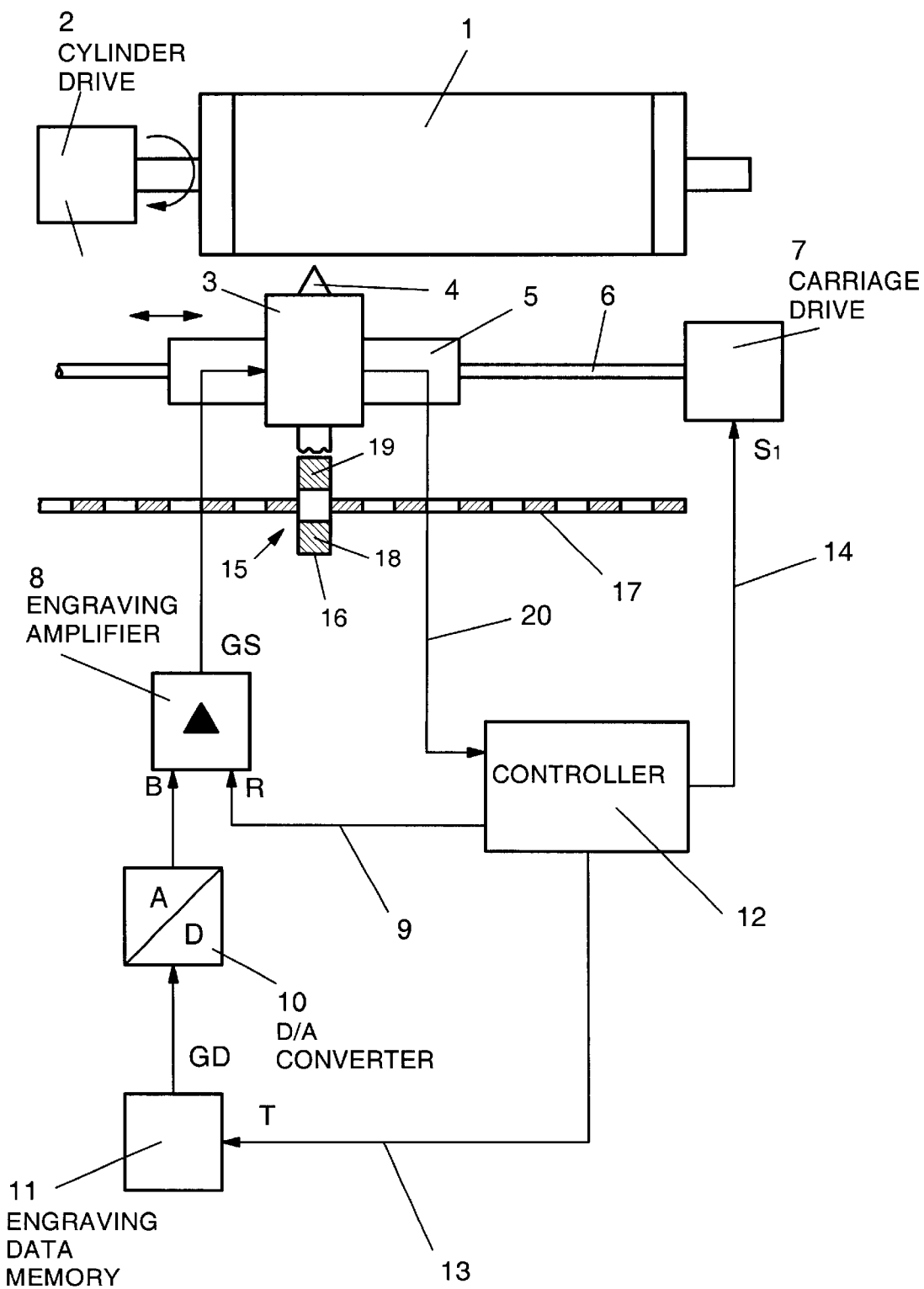
FIG. 1 is a schematic block circuit diagram of an engraving machine for print cylinders.

FIG. 1 shows a schematic block circuit diagram of an engraving machine for engraving print cylinders for rotogravure. For example, the engraving machine is a HelioKlischograph® of Hell Gravure Systems GmbH, Kiel, DE.

A print cylinder 1 is rotationally driven by a cylinder drive 2.

Particularly in packaging rotogravure, the engraving on the print cylinder 1 occurs with a single engraving element 3 that, for example, is designed as an electromagnetic engraving element with an engraving stylus 4 as cutting tool.

In the illustrated exemplary embodiment, the engraving element 3 with its engraving support is located on an engraving carriage 5 on which the engraving element 3 can be manually displaced on its engraving support in the axial direction of the print cylinder 1 and locked. Via a spindle 6, the engraving carriage 5 is driven in the axial direction of the print cylinder 1 by an engraving carriage drive 7 in order to position the engraving carriage 5 with the engraving element 3 and move it along the print cylinder 1 during the engraving.

The engraving carriage drive 7 is designed, for example, as a stepping motor drive. The stepping motor is driven by a motor clock sequence, each clock thereof corresponding to a traversed, axial path increment of the engraving element. By counting the clocks of the motor clock sequence with a position counter, thus, the respective axial position of the engraving element can be identified or, the engraving element can be displaced onto a defined axial position by counting a predetermined plurality of clocks.

The engraving stylus 4 of the engraving element 3 cuts a series of cups arranged in a print raster into the generated surface of the rotating print cylinder engraving line by engraving line while the engraving carriage 5 with the engraving element 3 moves along the print cylinder 1 in feed direction. Alternatively, the engraving element 3 can also be coupled to the rotating spindle 6 with a spindle nut. In this case, the common engraving carriage 5 is eliminated.

The engraving stylus 4 of the engraving element 3 is controlled by an engraving control signal GS. The engraving control signal GS is formed in an engraving amplifier 8 from the superimposition of a periodic raster signal R on a line 9 with an image signal B that represents the gradations between "light" (white) and "dark" (black) of the cups to be engraved. Whereas the periodic raster signal (R) effects a vibrating lifting motion of the engraving stylus 4 for producing the engraving raster, the image signal values B—in conformity with the gradations to be engraved—determine the respective geometrical dimensions such as penetration depth, transverse diagonal and longitudinal diagonal of the cups engraved into the generated surface of the print cylinder 1.

The analog image signal B is acquired in a D/A converter 10 from engraving data (GD) that are stored in an engraving data memory 1 and read out therefrom engraving line by engraving line and supplied to the D/A converter 10. An engraving datum of at least one byte that, among other things, contains the gradation between "light" and "dark" to be engraved as engraving information is thereby allocated to each engraving location for a cup on the print cylinder 1.

A controller 12 generates the raster signal (R) on the line (9), a read clock sequence (T) on a line 13 for reading the engraving data (GD) out from the engraving data memory 11 and a feed command $S_1$ on a line 14 to the engraving carriage drive 7 for controlling the step-by-step advance of the engraving carriage 5.

Before the start of engraving, the position counter (not shown) in the engraving carriage drive must be reset, and the respective axial zero position of the engraving element 3 following the reset must be identified in order, for example, to position the engraving element 3 to the desired, axial start of engraving point proceeding from the identified zero position.

For determining the axial position of the engraving element 3, for example the zero position, the engraving machine inventively comprises an apparatus 15 that is composed of a light barrier 16 as a reference mark attached to the engraving element or the engraving support and of a stationary toothed comb 17 as a shadowing element for the light barrier 16.

For example, the light barrier 16 is designed as bifurcated light barrier and comprises a light source 18 and a light detector 19 lying thereopposite, between which the stationary toothed comb 17 is located. The optical axis of the light source 18 and of the light detector 19 lies in a plane that is perpendicular to the feed direction of the engraving carriage 5 and proceeds through the engraving stylus 4. For determining the zero position, the engraving element 3 supplies corresponding signals via a multiple line 20 to the controller 12. The toothed comb 17 secured to the base of the engraving machine is directed in the feed direction of the engraving carriage 5 and has its longitudinal extent extending at least over the maximum axial displacement range of the engraving element 3 along the print cylinder 1. For example, the toothed comb 17 is designed as a milled metal rail.

Figure 2:
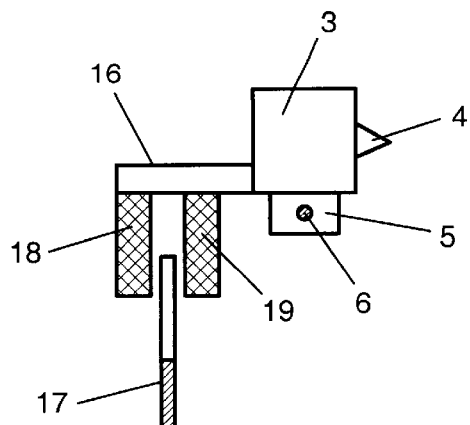
FIG. 2 is a side view of an apparatus for determining the axial position of an engraving element.

FIG. 2 shows a side view of the apparatus 15 for determining the axial position of the engraving element 3. What are shown are the stationary toothed comb 17 in crossection and the engraving element 3 with the bifurcated light barrier 16 comprising the light source 18 and the light detector 19.

Figure 3:
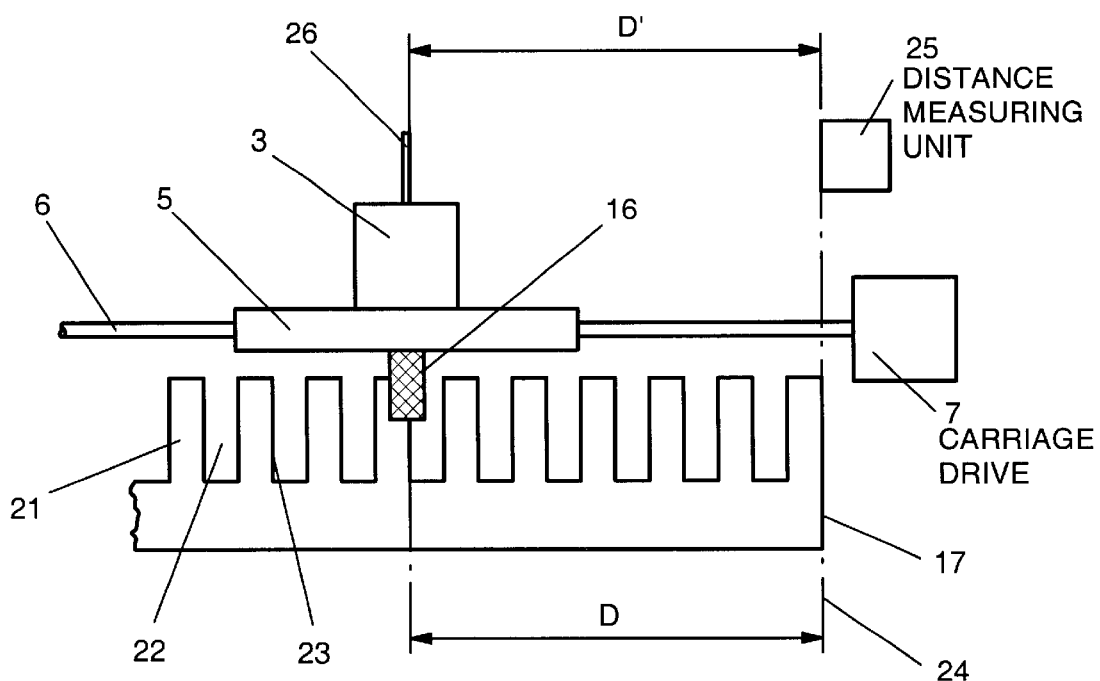
FIG. 3 is a first exemplary embodiment of an apparatus for determining the axial position of an engraving element, shown in a front view.

FIG. 3 shows a front view of the apparatus 15 for determining the axial position of the engraving element 3. What are shown are the stationary toothed comb 17 with teeth 21 and tooth gashes 22 in its longitudinal expanse and the engraving element 3 with the light barrier 16 overlapping the toothed comb 17. Together with the engraving carriage 5, the engraving element 3 moves in the direction of the longitudinal extent of the toothed comb 17 by means of the spindle 6 and the engraving carriage drive 7. One of the tooth faces 23 of each and every tooth 21, for example each negative tooth face 23, represents the zero position of the engraving element 3 or, respectively, the distance D of the zero position from an axial reference point 24 at the edge of the displacement range as a multiple of the tooth division of the toothed comb 17, whereby the tooth division corresponds to the distance of two relevant tooth faces 23 from one another.

Given displacement of the engraving element 3 from a momentary position along the toothed comb 17 with the engraving carriage drive 7, the light barrier 16 "seeks" the closest, relevant tooth face 23 as a brightness transition between a tooth 21 and a tooth gash 22, and the engraving element 3 supplies a stop signal to the controller 12 via the multiple line 20. As a result of the stop signal, the engraving element 3 is arrested in the zero position at the corresponding face 23 of the toothed comb 17. Since which relevant tooth face 23 the engraving element 3 has stopped at is not known, the actual distance D of the zero position of the engraving element 3 from the reference point 224 is not yet known. Given an assumed tooth division of 10 cm, for example, the actual distance D can amount to D=10 cm or a multiple thereof, i.e. 20 cm, 30 cm, 40 cm, etc.

FIG. 3 shows a first exemplary embodiment of the apparatus 15 wherein the apparatus 15 inventively comprises a distance measuring means 25 that initially measures the approximate distance D' of the zero position of the engraving element 3 from the reference point 24. For example, the distance measuring unit 25 is an ultrasound sensor. The zero position of the engraving element 3 is marked, for example, by a reflector 26 for the ultrasound that is attached to the engraving element 3. The distance measurement can ensue in an axial measuring channel attached to the engraving machine.

The approximate measured result is forwarded via the multiple line 20 to the controller 12 wherein the exact distance D between the zero position and the reference point 24 is determined on the basis of the approximate distance D'. When, for example, the approximate distance amounts to D'≈22 cm, the exact, actual distance is D=20 cm, whereby the precision of the actual distance is dependent on the manufacturing precision of the toothed comb 17.

For magazine rotogravure, a plurality of engraving lanes of predetermined lane widths lying side-by-side in axial direction of the print cylinder 1 are engraved with a respectively allocated engraving element 3. In this case, the engraving elements 3 are positioned and arrested such on the engraving carriage 5 such that they are spaced from one another in conformity with the predetermined lane widths. Alternatively, the engraving elements 3 can also be individually coupled to the rotating spindle 6 with spindle nuts. In this case, the common engraving carriage 5 is again eliminated.

In this case, the approximate distances D' of the individual engraving elements 3 are preferably successively measured, whereby the reflectors 26 required for the measurement are successively pivoted into the measuring channel, for example with electromagnets.

Figure 4:
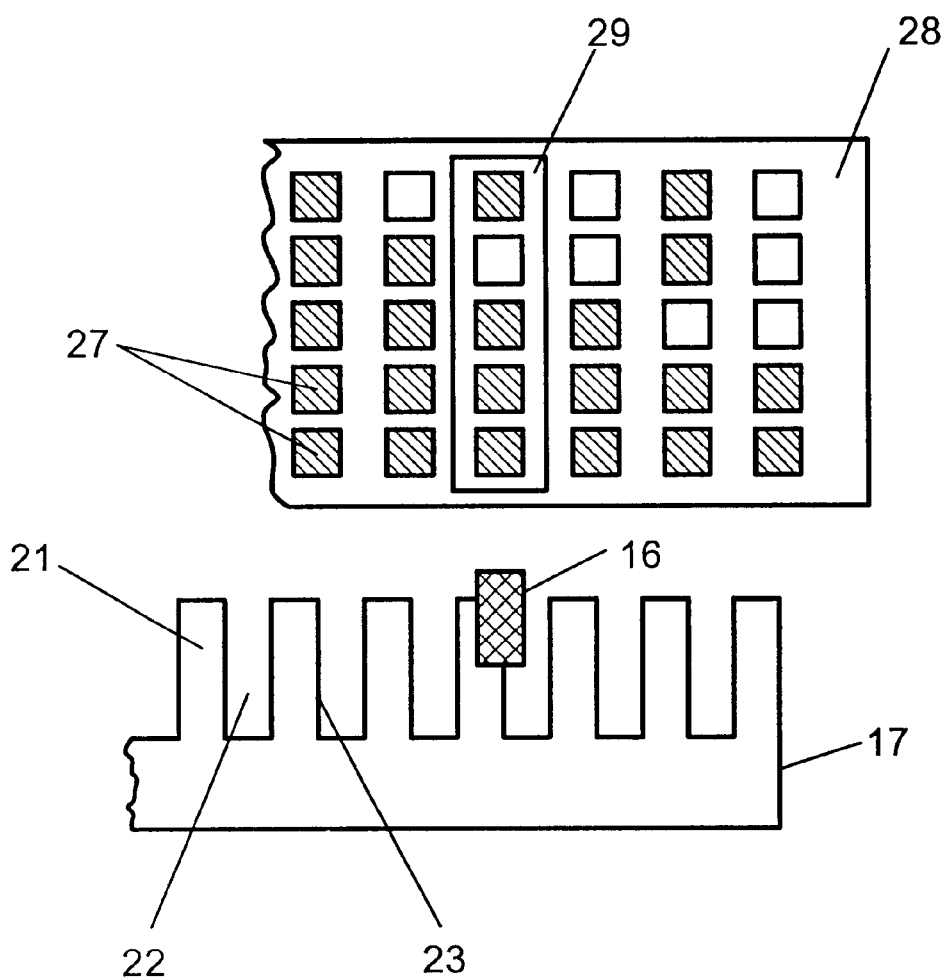
FIG. 4 is a second exemplary embodiment of an apparatus for determining the axial position of an engraving element, shown in a front view.

FIG. 4 shows a second exemplary embodiment of the apparatus (15), whereby an identifier in the form of a binary code (27) of respectively n bits is allocated to each relevant tooth face (23) of the toothed comb (17). The actual relevant tooth face at which an engraving element (3) is stopped in its zero position can be determined on the basis of the "read" binary code (27), and, thus, the actual distance D between the zero position and the reference point (24) can be directly identified.

In the illustrated exemplary embodiment, the binary codes (27) are black and white marks located on a steel band (28) whose longitudinal extent extends in axial direction and that is stationarily secured to the base of the engraving machine. For reading the binary code (27) on the steel band, the engraving element (3) (not shown) comprises a sensor (29) having a plurality of sensor elements corresponding in number to the plurality of bits, said sensor elements interpreting the light reflected by the binary code (27).

The binary code (27) that has been read is communicated via the multiple line (20) from the engraving element (3) to the controller (12) in FIG. 1 in which the actual distance D between the zero position of the engraving element (3) and the reference point (24) is determined on the basis of the binary code (27) that has been read, that tooth (21) of the toothed comb (17) allocated to the binary codes (27) and the tooth division.

$2^x$ axial positions can be discriminated with an x-bit binary coding. 32 axial positions can be identified with the 5-bit binary coding shown in FIG. 4.

When the zero positions of a plurality of engraving elements (3) are to be identified, each of the engraving elements (3) comprises a sensor (29), and the binary code (27) read by each sensor (29) is transmitted via the multiple line (20) to the controller (12) in FIG. 1 and is correspondingly interpreted there.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for determining an axial position of at least one engraving element in an electronic engraving machine for engraving a print cylinder for rotogravure, comprising the steps of:

with an engraving element, engraving a series of cups arranged in an engraving raster into a print cylinder, engraved depths of said cups determining gradations to be engraved between light and dark, for planar engraving of the cups, with the engraving element executing a feed motion along the print cylinder that is directed in an axial direction of the print cylinder;

providing a stationary toothed comb directed in an axial direction of the print cylinder whereby one of tooth faces of each and every tooth represents an axial distance from an axial reference point as a multiple of a tooth division of the toothed comb;

providing the engraving element with an axial reference mark;

determining a momentary axial position of the engraving element relating to print cylinder before the engraving;

displacing the engraving element together with its reference mark from said momentary position to a closest, relevant tooth face of the toothed comb corresponding to said axial position of the engraving element to be determined;

measuring an approximate distance of the reference mark from the reference point;

comparing the measured approximate distance to the multiple of the tooth division of the toothed comb; and determining from the comparison an exact distance of the position of the engraving element from the reference point.

2. The method according to claim 1 wherein the reference mark of the engraving element lies in a plane that is perpendicular to a feed direction of the engraving element and proceeds through the element of the engraving element producing the cups.

3. The method according to claim 1 wherein the reference mark of the engraving element is designed as a light barrier with the toothed comb as a shadowing element; and the relevant tooth face of the toothed comb is detected as a brightness transition between a tooth and a tooth gash.

4. A method for determining an axial position of at least one engraving element in an electronic engraving machine for engraving a print cylinder for rotogravure, comprising the steps of:

with an engraving element, engraving a series of cups arranged in an engraving raster into a print cylinder, engraved depths of said cups determining gradations to be engraved between light and dark, the engraving element executing a feed motion along the print cylinder that is directed in an axial direction of the print cylinder;

providing a stationary toothed comb directed in an axial direction of the print cylinder whereby one of tooth faces of each and every tooth represents an axial distance from an axial reference point as a multiple of a tooth division of the toothed comb;

providing the engraving element with an axial reference mark;

allocating an identifier to each relevant tooth face of the toothed comb;

determining a momentary axial position of the engraving element relative to the print cylinder before the engraving;

displacing the engraving element together with its reference mark from said momentary position to a closest, relevant tooth face of the toothed comb corresponding to said axial position of the engraving element to be determined;

detecting the allocated identifier of the corresponding relevant tooth face; and determining the distance of the position of the engraving element from the reference point from the detected identifier as a multiple of the tooth division of the toothed comb.

5. The method according to claim 4 wherein the reference mark of the engraving element lies in a plane that is perpendicular to a feed direction of the engraving element and proceeds through the element of the engraving element producing the cups.

6. The method according to claim 4 wherein the reference mark of the engraving element is designed as a light barrier with the toothed comb as a shadowing element; and the relevant tooth face of the toothed comb is detected as a brightness transition between a tooth and a tooth gash.

7. The method according to claim 4 wherein a binary code is employed as the identifier of the relevant tooth faces.

8. A method for determining an axial position of at least one engraving element in an electronic engraving machine for engraving a print cylinder for rotogravure, comprising the steps of:

providing a stationary toothed comb directed in an axial direction of the print cylinder whereby one of tooth faces of each and every tooth represents either a zero position of the engraving element or an axial distance of the zero position from an axial reference point as a multiple of a tooth division of the toothed comb;

measuring an approximate distance of the zero position of the engraving element from the reference point; and;

determining an exact distance of the zero position of the engraving element from the reference point based on the approximate distance.

9. An apparatus for determination of axial position of an engraving element in an electronic engraving machine for engraving a print cylinder for rotogravure with an engraving element, comprising:

a stationary toothed comb directed in an axial direction of the print cylinder, whereby one of tooth faces of each and every tooth represents an axial distance from an axial reference point as a multiple of a tooth division of the toothed comb;

a light barrier located at the engraving element as a reference mark of the engraving element, the stationary toothed comb serving as a shadowing element for the light barrier;

a distance measuring unit for measuring an approximate axial distance of a position of the engraving element from the reference point; and an evaluation unit for comparing the measured, approximate distance to the multiple of the tooth division of the toothed comb and for determining an exact distance of a position from the reference point from the comparison.

10. An apparatus for determination of axial position of an engraving element in an electronic engraving machine for engraving a print cylinder for rotogravure with an engraving element, comprising:

a stationary toothed comb directed in an axial direction of the print cylinder, whereby one of tooth faces of each and every tooth represents an axial distance from an axial reference point as a multiple of a tooth division of the toothed comb;

an identifier for each relevant tooth face of the toothed comb;

a light barrier located at the engraving element as a reference mark of the engraving element, the stationary toothed comb serving as a shadowing element for the light barrier;

a sensor located at the engraving element for detecting a respective identifier; and an evaluation unit for determining a distance of a zero position of the engraving element from the reference point from the detected identifier as a multiple of a tooth division of the toothed comb.

11. The apparatus according to claim 10, wherein the identifier is designed as a binary code.

12. The apparatus according to claim 10 wherein the sensor is designed as a light sensor for reading the light reflected by the identifier.

13. An engraving machine for engraving a print cylinder for rotogravure, comprising:

a rotationally seated print cylinder turned by a first drive;

an engraving carriage moved in an axial direction along the print cylinder with a second drive;

at least one engraving element arranged on the engraving carriage in displaceable and lockable fashion; and an apparatus for determining axial position of the engraving element relative to an axial reference point composed of a stationary toothed comb directed in an axial direction of the print cylinder, whereby one of tooth faces of each and every tooth represents an axial distance from an axial reference point as a multiple of a tooth division of the toothed comb;

a light barrier located at the engraving element as a reference mark of the engraving element, whereby the stationary toothed comb serves as a shadowing element for the light barrier;

a distance measuring unit for measuring approximate axial distance of a position of the engraving element from the reference point; and an evaluation unit for comparing the measured, approximate distance to the multiple of the tooth division of the toothed comb and for determining an exact distance of the position from the reference point from the comparison.

14. An engraving machine for engraving a print cylinder for rotogravure, comprising:

a rotationally seated print cylinder that is turned by a first drive;

an engraving carriage that can be moved in axial direction along the print cylinder with a second drive;

at least one engraving element that is arranged on the engraving carriage in displaceable and lockable fashion; and an apparatus for determining an axial position of the engraving element relative to an axial reference point composed of a stationary toothed comb directed in the axial direction of the print cylinder, whereby one of tooth faces of each and every tooth represents an axial distance from an axial reference point as a multiple of a tooth division of the toothed comb;

an identifier for each relevant tooth face of the toothed comb;

a light barrier located at the engraving element as a reference mark of the engraving element, whereby the stationary toothed comb serves as a shadowing element for the light barrier;

a sensor located at the engraving element for detecting the respective identifier; and an evaluation unit for determining a distance of the zero position of the engraving element from the reference point from the detected identifier as a multiple of the tooth division of the toothed comb.

* * * * *